Aug. 19, 1952     R. C. MAIN     2,607,533
INDICATING MEANS FOR THERMOSTATIC DEVICES
Filed Oct. 30, 1947
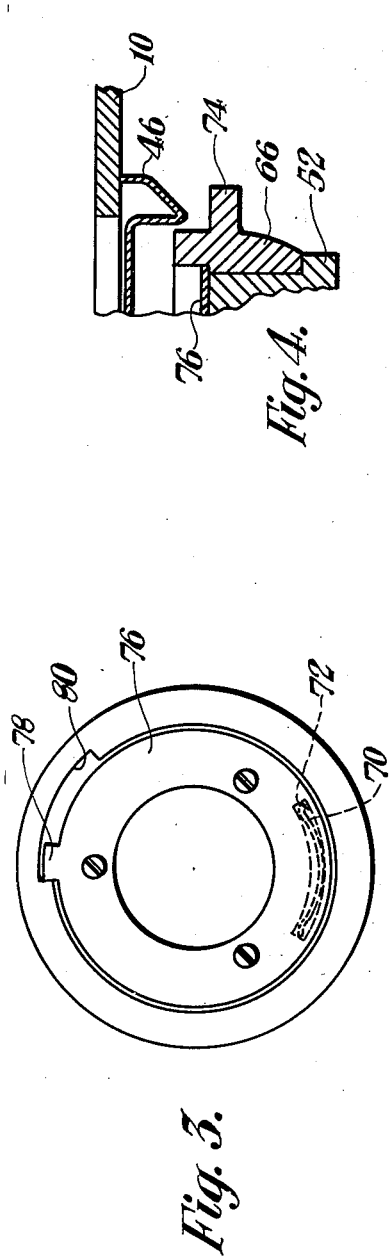
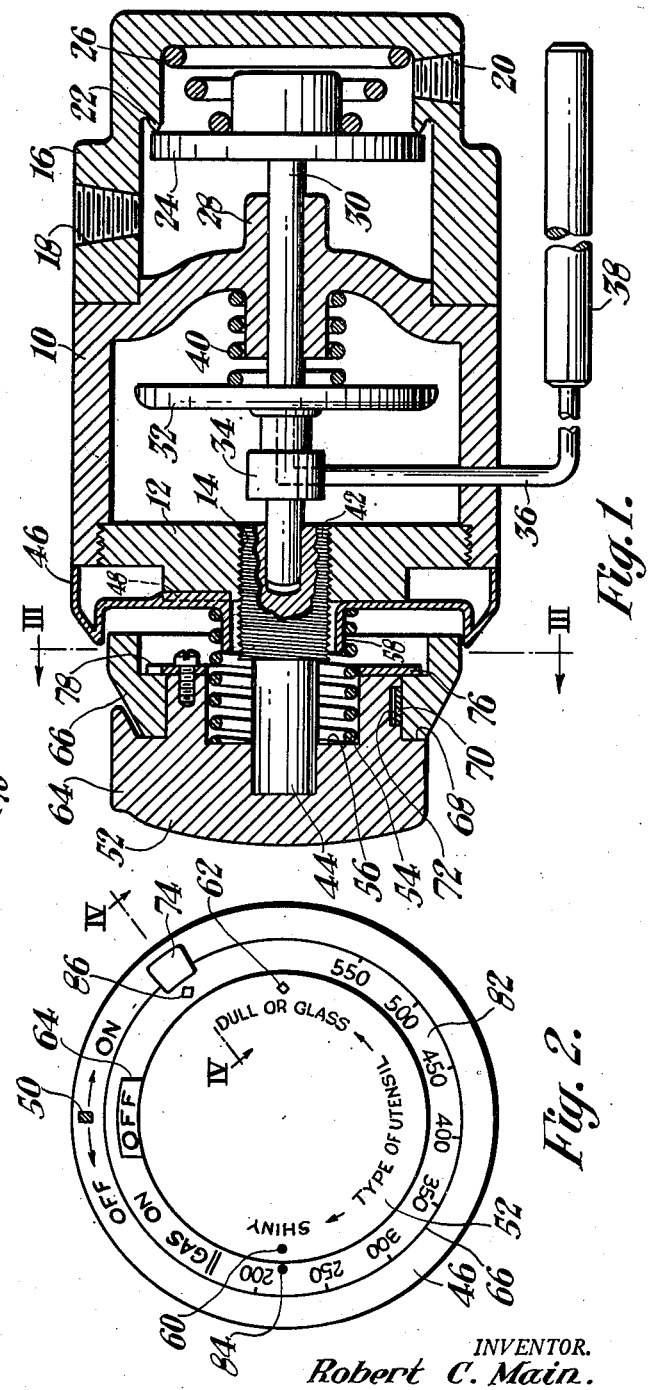
INVENTOR.
Robert C. Main.
BY
HIS ATTORNEY Patented Aug. 19, 1952

2,607,533

UNITED STATES PATENT OFFICE 2,607,533

INDICATING MEANS FOR THERMOSTATIC DEVICES

Robert C. Main, La Canada, Calif., assignor to Robertshaw-Fulton Controls Company, Youngwood, Pa., a corporation of Delaware Application October 30, 1947, Serial No. 783,077

2 Claims. (Cl. 236—99)

1

This invention relates to temperature regulators for cooking appliances such as domestic gas and electric ranges and, more particularly, to the adjusting means by which different temperature settings are made.

In the preparation of foods by oven cooking it has long been known that uniform results are dependent to a large extent upon the correct use of oven utensils. An appreciable difference in cooking time or temperature is required for foods in utensils having dull or black surfaces compared with bright or shiny materials. Much data are available concerning the use of lower oven temperatures for an equal cooking time whenever glass, black tin, enamel or any utensil having a dull or opaque surface is used; the adjustment being necessary due to most cook-book formulas being developed with shiny pans in mind. The necessity for adjustment is attributed to the increased radiant heat absorption of the dull or black utensils.

The lower oven temperatures required for dull, black or glass utensils averages 75° F. less over the usual cooking range than that specified in standard cook books. It would be inconvenient, irksome and subject to miscalculation if the operator were required to make the adjustment mentally before setting the oven thermostat. Hence, an object of this invention is to facilitate the production of properly cooked foods regardless of the type of surface finish on the utensil.

Another object of the invention is to eliminate the necessity for calculation or experimentation on the part of the operator in setting the regulator for the different types of utensil and to render the operation spontaneous.

Another object of the invention is to render cooking operations more economical by encouraging the use of utensils having greater heat absorbing capacity.

Another object of the invention is to secure the improved results without unduly complicating the standard adjusting means or advancing the cost of manufacture.

Other objects and advantages will become apparent from the following description taken in connection with the accompanying drawings, wherein:

Fig. 1 is a longitudinal sectional view through a conventional temperature regulator having the invention applied thereto;

Fig. 2 is an end elevation of the structure shown in Fig. 1;

Fig. 3 is a cross section taken on the line III—III of Fig. 1;

2

Fig. 4 is a detail sectional view taken on the line IV—IV of Fig. 2.

Referring more particularly to Figs. 1 to 4 inclusive of the drawings, the temperature regulator includes a casing 10 of cup-shaped form having the open end thereof provided with a closure cap 12 provided with an axial threaded opening 14. An end casing 16, also of cup-shaped form, has its open end secured to the bottom of the body 10 and is provided with a pair of lateral openings 18 and 20 forming inlet and outlet passageways, respectively, for the fuel to be regulated. Formed intermediate the passageways 18, 20 is an annular seat 22 with which a control element or disc valve member 24 is cooperable to control the flow of fuel between the ports 18 and 20. The valve member 24 is biased away from the valve seat 22 by a coil spring 26 supported against the bottom surface of the end casing 16.

The bottom of the body 10 is provided with oppositely disposed projections or bosses 28 which are suitably apertured for the reception of a valve stem 30 which extends into operative engagement with the valve member 24. The opposite end of the valve stem 30 extends into the casing 10 and engages with a diaphragm element 32 forming part of a temperature responsive means for moving the valve member 24 relative to its seat 22. The diaphragm element 32 is connected through a hollow stud 34 with a capillary tube 36 and a bulb member 38 completing the temperature responsive means. The bulb member 38 is adapted to be located in the oven of a domestic gas range and will cause expansion or contraction of the diaphragm element 32 in response to changes in temperature which produce changes in the volume of the liquid with which the temperature responsive means is filled.

A coil spring 40 is interposed between the diaphragm 32 and the bottom of the casing 10 for biasing the diaphragm in one direction and causing the stud 34 to maintain contact with the open end of an operating shaft 42 which is disposed within the closure cap 12. The shaft 42 is suitably threaded for engagement with the threaded opening 14 and has a reduced end 44 projecting beyond the closure cap 12 by means of which the shaft 42 may be rotated to impart longitudinal movement thereto.

A bezel member 46 formed of sheet material is mounted on the casing 10 and serves to enclose the closure cap 12. Relative rotation between these parts is prevented by a key element 48 on the closure cap 12 engaging with the bezel member 46 which is suitably formed for its reception.

The bezel member 46 carries a reference point 50 with oppositely disposed arrows indicating "Off" and "On" directions of rotation as shown in Fig. 2.

A knob 52 is press-fitted or otherwise detachably secured to the projecting end 44 of the shaft 42 and is operable manually for imparting the desired rotation thereto. Yieldable means in the form of a coil spring 54 is utilized for maintaining the bezel member 46 in position relative to the casing 10. Thus, the coil spring 54 is partly housed within a suitable recess 56 formed within the knob 52 and extends therefrom to the bezel member 46 where it is supported upon an annular projection 58 formed on the bezel member 46 and through which the shaft 42 loosely extends.

The knob 52 carries indicia on its face such as the legends "Shiny" on one side and "Dull or Glass" diametrically opposed thereto. A circular reference point 60 is located adjacent the legend "Shiny" while a diamond or non-circular shaped reference point 62 is located adjacent the legend "Dull or Glass." Furthermore, the knob 52 is provided with an upstanding rib 64 on its periphery and the legend "Off" is formed thereon for registry with the reference point 50 formed on the bezel 46.

An annular member 66 is mounted on the knob 52 and extends into proximate relation with the bezel member 46. Thus, the knob 52 has its outer periphery reduced opposite the recess 56 to form an annular shoulder portion 68 upon which the annular member 66 may be seated. A frictional driving connection between the knob 52 and the annular member 66 is provided by a leaf spring 70 which is housed within an arcuate recess 72 formed in the shoulder portion 68 of the knob 52 and which engages with the overlying portion of the annular member 66 to create the desired friction. However, while the knob 52 and annular member 66 are rotatable as a unit due to the construction described, the annular member 66 also is adapted for rotation relative to the knob 52 for a purpose apparent hereinafter.

The relative rotation between knob 52 and annular member 66 is effected by a handle 74 projecting from the outer periphery of the annular member 66 for manipulation by the operator. The degree of relative rotation between these parts is limited by the provision of a plate 76 secured to the inner face of the knob 52 and overlying the annular member 66. The plate 76 and the annular member 66 have interengaging means in the form of a lug 78 projecting from the plate 76 into an arcuate slot 80 formed on the annular member 66 and being adapted to engage with either end of the slot 80 for the specified purpose. This construction is more clearly shown in Fig. 3 of the drawings.

The annular member 66 carries temperature indicia in the form of a scale 82 extending from the lowest graduation to the highest in a direction opposite to that of the thread on the shaft 42. Thus, in the embodiment herein shown, the thread on the shaft 42 is left-handed and, accordingly, the scale 82 extends in a counterclockwise direction from the lowest graduation to the highest. A circular reference point 84 is located on the scale 82 for registry with the corresponding reference point 60 on the knob 52. Similarly, a diamond or non-circular shaped reference point 86 is located on the scale 82 approximately the same distance apart from the reference point 62 as the length of the arcuate movement of the lug 78 in the slot 80.

The regulator is shown with the parts in the position they occupy when in the "Off" position with the valve member 24 engaging the seat 22 and cutting off the supply of fuel to the oven burner. In starting a cooking operation, and assuming that a shiny utensil is being used, the knob 52 is rotated in a clockwise direction causing longitudinal movement of the shaft 42 due to its threaded connection with the closure cap 12. Clockwise rotation of the shaft 42 causes it to move to the left as viewed in Fig. 1 of the drawings due to the left-hand threaded engagement with the closure cap 12. The bias of the springs 40 and 26 thereupon causes the diaphragm element 32 to move to the left and the valve member 24 to be unseated, respectively. The distance which the valve member 24 is unseated is determined by the temperature to which the annular member is set as indicated by the particular temperature indicia on the scale 82 which is in registry with the reference point 50 on the bezel member 46.

As the oven temperature increases, the diaphragm element 32 will expand and move the valve member 24 toward its seat 22 through operation of the valve stem 30 and against the bias of the coil spring 26. Should the temperature of the oven become reduced below the setting of the knob 52, then the diaphragm element will respond thereto by contracting and causing the valve member 24 to move away from its seat 22 under bias of the coil spring 26. Thus the valve member 24 is positioned to establish a controlled temperature corresponding to the selected temperature setting by operation of the knob 52. It is apparent that the operation of the regulator under such circumstances is in accordance with conventional practice and further explanation is deemed unnecessary.

In the event that a cooking operation is to be conducted with a dull surface or glass utensil as previously described, then a setting approximately 75° F. below that required for shiny utensils may be used. This temperature differential is approximately correct over that specified in standard cook books due to the recipes being based for the most part on the use of shiny metal utensils. No calculation on the part of the operator is required, however, due to the limited rotation of the annular member 66 relative to the knob 52 which has been provided by this invention. Thus, upon starting the oven under such circumstances, the handle 74 is manipulated to rotate the annular member 66 relative to the knob 52 and place the diamond reference point 86 in registry with the diamond reference point 62. As previously stated, the engagement of the lug 78 with the opposite end of the slot 80 from that shown in Fig. 3 of the drawings renders this operation spontaneous or semi-automatic on the part of the operator. The knob 52 can then be rotated in the customary manner carrying with it the annular member 66 in order to establish the desired temperature setting. Thus, the correct temperature indicia on the scale 82 is placed in registry with the reference point 50 on the bezel 46 in accordance with the standard cook book recipe as in the preceding instance when a shiny utensil was used. The cooking operation will then proceed under control of the temperature responsive control means comprising valve member 24 and temperature responsive means 32, 36, 38, all as previously described.

It will be understood that many changes may be made in the details and arrangement of parts within the scope of the appended claims without departing from the spirit of the invention.

I claim:

1. A temperature regulator for appliances having a source of radiant heat for a cooking utensil, comprising in combination, a pair of relatively movable members, one said member having a reference point for registry selectively with a plurality of temperature indicia on the other said member, temperature responsive control means, a rotatable shaft operatively engaging said control means, a knob secured to said shaft and being operable for positioning said control means to establish a controlled temperature, a frictional driving connection between said knob and said other member for rotating the latter to a selected temperature setting by operation of said knob but permitting rotation of said other member relative to said knob, a handle carried by said other member for effecting said rotation relative to said knob for varying said controlled temperature while retaining said selected temperature setting, and means operative between said knob and said other member for limiting said relative rotation of said other member to an amount sufficient to vary said controlled temperature to compensate for variation in the radiant heat absorption of utensils of different materials and/or surface finish.

2. A temperature regulator for appliances having a source of radiant heat for a cooking utensil, comprising in combination, a casing, temperature responsive control means in said casing, a rotatable shaft operatively engaging said control means and projecting from said casing, a bezel member mounted on said casing for non-rotation relative thereto and having a reference point thereon, a knob secured to the projecting end of said shaft and being operable for positioning said control means to establish a controlled temperature, yieldable means operative between said bezel member and said knob for supporting said bezel member relative to said casing, an annular member mounted on said knob and extending into proximate relation with said bezel member, said annular member having temperature indicia thereon for registry selectively with said reference point on said bezel member, a frictional driving connection between said knob and said annular member for rotating the latter to a selected temperature setting by operation of said knob but permitting rotation of said annular member relative to said knob, a handle carried by said annular member for effecting said rotation relative to said knob for varying said controlled temperature while retaining said selected temperature setting a plate secured to said knob and overlying said annular member, and interengaging means on said plate and said annular member for limiting said relative rotation of said annular member to an amount sufficient to vary said controlled temperature substantially 75° F. to compensate for variation in the radiant heat absorption of utensils of different materials and/or surface finish.

ROBERT C. MAIN.

REFERENCES CITED

The following references are of record in the file of this patent:

UNITED STATES PATENTS

| Number | Name | Date |
|---|---|---|
| 1,881,637 | Johnson | Oct. 11, 1932 |
| 2,153,886 | Grayson | Apr. 11, 1939 |
| 2,303,011 | Weber et al. | Nov. 24, 1942 |